Patented Sept. 19, 1939

2,173,375

UNITED STATES PATENT OFFICE 2,173,375

PROCESS OF MANUFACTURING LIQUID HYDROCARBONS

James R. Rose, Edgeworth, Pa.

No Drawing. Application July 29, 1938,
Serial No. 222,019

3 Claims. (Cl. 196—10)

This invention relates to a process which has been found to be particularly advantageous in the treatment of gases resulting from the refining of crude oil for the purpose of obtaining therefrom hydrocarbon liquid polymers suitable for motor fuel.

As is well known, the different oil fields produce crude oils that differ quite widely in their content of saturates and unsaturates, with a resultant variation in the content of the gases produced by the refining of such crudes. It is particularly important, in the treatment of these gases for the purpose of obtaining liquid hydrocarbon polymers such as referred to, to be able to employ therewith a catalyst which is capable of operating efficiently on all such gases.

The catalyst described and employed in the practice of my process herein has been found to be particularly efficient in obtaining from gases of the character referred to a maximum recovery of liquid hydrocarbon of high octane rating. It has been found further capable of effecting a polymerization of such gases without breaking down the mixture of the ingredients of which the catalyst is composed and also without material carbonization of the catalyst. The catalyst described herein has been employed by me in the treatment of gases resulting from the cracking of oil and containing saturates and unsaturates and small amounts of liquid hydrocarbons heavier than butane (such as pentane and pentene). In practicing my process, the said gases are first subjected to a compressing and cooling action whereby a preliminary separation of liquid hydrocarbon from gaseous material is obtained and the liquid thus separated is delivered into a stabilizer tower and is heated to a temperature of approximately 300° F., while the gases remaining from this preliminary separation and those produced within and delivered from the stabilizer tower are liquefied under a pressure of from 800 to 1500 pounds per square inch, with suitable cooling; the resultant liquid, or largely liquid, product is cracked into a gaseous condition under temperatures of from 800° to 1500° F., while under the aforesaid pressure, and is then circulated through banks of catalyst receptacles charged with the catalyst described herein. The resultant hydrocarbon is conducted through receptacles wherein a separation of any gaseous products from the liquid hydrocarbon is obtained and these gases are recycled, together with the gases delivered from the stabilizer tower and from the first condensation step. The liquid hydrocarbon thus recovered is delivered into the stabilizer tower. It is not only of a very high octane rating, but is stable, whereby it can be used either with or without blending.

The particular catalyst which I employ consists of carnotite and a mixture of phosphate rock, Floridan clay, zinc phosphate, a barium halide (preferably the chloride) and commercial fire bond. I prefer to use the run of the crush of the carnotite, wherein the largest particles are about the size of a hickory nut. I also prefer to use phosphate rock in the form of lumps of about the same size as the lumps of carnotite. The zinc phosphate is used in its powdered form and the barium chloride in its crystalline form, the particles of the latter being about the size of coarse salt. The Floridan clay is granular and of medium mesh, and the fire bond is granular but of a very much finer mesh. All of the ingredients except the carnotite are mixed together with water, permitted to dry, and when ready for use are broken up into lumps to be placed within the catalyzing chambers. The carnotite is not mixed with the mixture of the other ingredients, but is interposed between the latter and the entering gases to be polymerized. Thus, where the gases are brought into the top of the chamber or chambers containing the catalyst, the carnotite will be on top of the mixture of the other ingredients; where the gases are brought into the bottom of the chamber or chambers containing the catalyst, the carnotite will be below the mixture of the other ingredients. In both cases, it is contacted by the gases before they contact with the other ingredients. A considerable variation in the proportions of the ingredients composing my catalyst can be employed. For instance, beneficial results may be accomplished by using the ingredients in substantially the following range of proportions:

| | Parts by weight |
|---|---|
| Natural phosphate rock | 10 to 50 |
| Floridan clay | 10 to 50 |
| Zinc phosphate | 5 to 30 |
| Barium halide (preferably chloride) | 5 to 30 |
| Fire bond | 10 to 40 |

Carnotite, 25% to 100% by weight of the total weight of all other ingredients.

I have found that the best results which I have been able to obtain thus far with my catalyst have been secured where the ingredients are used in substantially the following proportions by weight:

| | Grams |
|---|---|
| Natural phosphate rock | 400 |
| Floridan clay | 400 |
| Zinc phosphate | 70 |
| Barium chloride | 60 |
| Fire bond | 150 |
| Carnotite | 400 |

The purpose of placing the carnotite ahead of the catalyst mixture is to obtain an ionization of the gases before they are subjected to the catalytic action of the other catalytic material. It is a well known fact that carnotite is not only highly radioactive, but that it contains large volumes of silica, which possesses catalytic qualities.

In my copending application Serial No. 200,359, I have claimed a process wherein a catalyst is employed consisting of a mixture of natural phosphate rock, Floridan clay, zinc phosphate, barium chloride, fire bond and carnotite, but is distinguished from my process herein wherein the carnotite is interposed between the path of the gases and the mixture of the other five ingredients therebeyond.

In the mixture of catalytic ingredients, the Floridan clay has a filling effect, while the fire bond, being water glass, binds the whole mass together so as to prevent the same from breaking down. Both the Floridan clay and the fire bond are themselves catalytic in action; and, because of their use in combination with carnotite and in admixture with the ingredients other than carnotite, I am enabled to produce, from crude oil refinery gases containing saturates and unsaturates, liquid hydrocarbons which are not only of a very high octane rating but which are stable, thereby enabling them to be used either with or without blending.

Having thus described my invention, what I claim is:

1. The process of manufacturing liquid hydrocarbons suitable for motor fuel from crude oil refinery gases containing saturates and unsaturates which comprises liquefying said gases by pressure and cooling; subjecting the liquid thus formed, while under said pressure, to a cracking temperature; and passing the resultant products while under said pressure in contact first with carnotite and then with a mixture of natural phosphate rock, zinc phosphate, barium halide, Floridan clay and fire bond in substantially the following proportions by weight:

| | Parts |
|---|---|
| Natural phosphate rock | 10 to 50 |
| Floridan clay | 10 to 50 |
| Zinc phosphate | 5 to 30 |
| Barium halide | 5 to 30 |
| Fire bond | 10 to 40 | the carnotite being 25% to 100% by weight of the total weight of all other ingredients.

2. The process of manufacturing liquid hydrocarbons suitable for motor fuel from crude oil refinery gases containing saturates and unsaturates which comprises liquefying said gases by pressure and cooling; subjecting the liquid thus formed, while under said pressure, to a cracking temperature; and passing the resultant products while under said pressure in contact first with carnotite and then with a mixture of natural phosphate rock, zinc phosphate, barium chloride, Floridan clay and fire bond in substantially the following proportions by weight:

| | Parts |
|---|---|
| Natural phosphate rock | 10 to 50 |
| Floridan clay | 10 to 50 |
| Zinc phosphate | 5 to 30 |
| Barium chloride | 5 to 30 |
| Fire bond | 10 to 40 | the carnotite being 25% to 100% by weight of the total weight of all other ingredients.

3. The process of manufacturing liquid hydrocarbons suitable for motor fuel from crude oil refinery gases containing saturates and unsaturates which comprises liquefying said gases by pressure and cooling; subjecting the liquid thus formed, while under said pressure, to a cracking temperature; and passing the resultant products while under said pressure in contact first with carnotite and then with a mixture of natural phosphate rock, zinc phosphate, barium chloride, Floridan clay and fire bond in substantially the following proportions by weight:

| | Grams |
|---|---|
| Natural phosphate rock | 400 |
| Floridan clay | 400 |
| Zinc phosphate | 70 |
| Barium chloride | 60 |
| Fire bond | 150 | the carnotite being in substantially the proportion of 400 grams by weight.

JAMES R. ROSE.